March 7, 1939.  A. A. McCORMACK  2,149,974
SEAL FOR REFRIGERATING APPARATUS
Filed Oct. 30, 1935  2 Sheets-Sheet 1

INVENTOR.
Alex A. McCormack
BY
Spencer Hardman and Fehr
ATTORNEYS

March 7, 1939.  A. A. McCORMACK  2,149,974
SEAL FOR REFRIGERATING APPARATUS
Filed Oct. 30, 1935  2 Sheets-Sheet 2

INVENTOR.
Alex A. McCormack
BY
Spencer Hardman
ATTORNEYS

Patented Mar. 7, 1939

2,149,974

UNITED STATES PATENT OFFICE 2,149,974

SEAL FOR REFRIGERATING APPARATUS

Alex A. McCormack, Dayton, Ohio, assignor to General Motors Corporation, Dayton, Ohio, a corporation of Delaware Application October 30, 1935, Serial No. 47,515

2 Claims. (Cl. 286—11)

This invention relates to refrigerating apparatus and more particularly to the sealing of refrigerating systems.

It is of utmost importance that refrigerating systems be perfectly sealed. In ordinary joints in such a system, it is possible to get a satisfactory seal by using solder or a lead gasket. However, where an external electric motor is used to drive a compressor in a refrigerating system, it is necessary to provide a shaft seal. Shaft seals in ordinary situations have always been rather difficult problems and the problems of shaft seals are particularly difficult in refrigerating systems. This is for the reason that they not only have to make a perfectly tight joint, which usually means that considerable friction is present because shaft seals are difficult to lubricate, but such seals are also subject to chemical and electrochemical corrosion and deterioration, and non-metallic materials are particularly subject to swelling due to the presence of lubricant, refrigerant and sometimes moisture and acids in addition to the deterioration.

It is of course obvious that the sealing surface divides the air on the outside from the fluid on the inside and that therefore one edge of the sealing surface will be exposed to the action of refrigerant and lubricant within the compressor while the other will merely be subject to air.

The problem is complicated by the fact that most of the bearing materials which will best stand wear under conditions of poor lubrication, contain copper and most refrigerants, especially sulphur dioxide, when any moisture is present, rapidly form a very harmful hard type of corrosion which cuts the seats and particularly causes the sealing surface to stick together. On the other hand, materials which do not form such a harmful type of corrosion, do not withstand wear sufficiently well under the poor lubricating conditions present in the shaft seal, to make them satisfactory.

It is therefore an object of my invention to provide an improved seal for refrigerating systems which will withstand wear, corrosion and deterioration without failure.

It is a more specific object of my invention to provide an improved shaft seal for refrigerating systems which will not fail when moisture enters the systems.

It is a further object of my invention to provide a shaft seal in which the portion of the wearing surface remote from lubrication and corrosion is formed of a metal having a high resistance to wear under poor lubricating conditions while the portion of the surface nearest the lubricant and the refrigerant is made of a material which has a higher resistance to corrosion but which may require a better lubrication to withstand wear.

Further objects and advantages of the present invention will be apparent from the following description, reference being had to the accompanying drawings, wherein a preferred form of the present invention is clearly shown.

Figure 1:
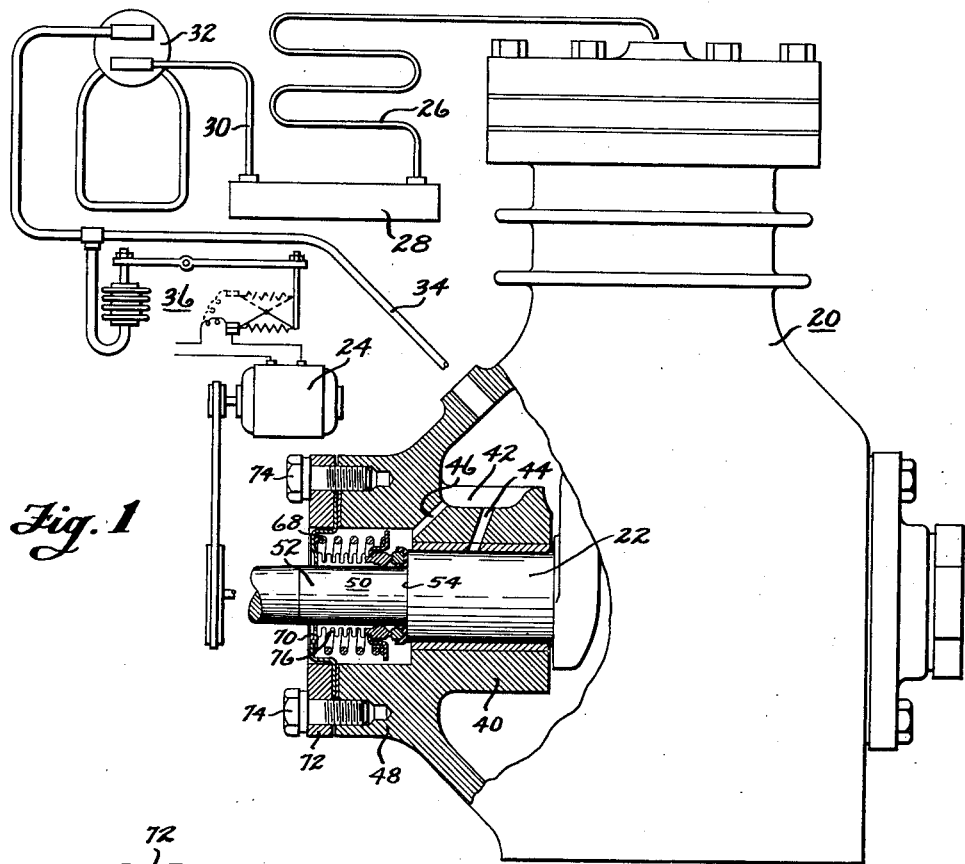
Fig. 1 is a view of a refrigerating system, partly diagrammatic, including a compressor provided with a shaft seal embodying one form of my invention.

Briefly, I have disclosed a refrigerating system provided with a refrigerant compressor driven by an external electric motor and provided with a bellows type of stationary shaft seal. A seal ring of hardened nitralloy is fitted to a shoulder upon the drive shaft of the refrigerant compressor by a special gasket of an elastic, rubber-like material having a composition which is adapted to keep the swelling of this gasket in the presence of the refrigerant and lubricant at a minimum and to withstand deterioration which might be caused by refrigerant and lubricant. I also provide a spring pressed seal ring connected to a bellows which makes relatively rotating sealing engagement with the nitralloy ring mounted upon the shaft.

This seal ring preferably is made of a leaded bronze which has good wearing properties under poor lubricating conditions. In order to protect this leaded bronze sealing ring from the corrosive action of the refrigerant, I provide upon the sealing ring, an annular sealing surface of a tin or tin alloy immediately surrounding the sealing surface of leaded bronze to protect the leaded bronze sealing surface from the corrosive action of the refrigerant. This ring of tin or tin alloy stands between the leaded bronze sealing surface and the refrigerant and lubricant and thus receives sufficient lubrication, while it withstands the corrosive action of the refrigerant.

Referring now more particularly to the drawings, there is shown an ordinary reciprocating compressor 20, preferably containing a refrigerant and lubricant such as sulphur dioxide and a mineral oil which is provided with a drive shaft 22 which projects without the crank case of the compressor to receive a pulley which is driven by a separate electric motor 24. The compressor 20 draws evaporated refrigerant into its crank case and discharges the compressed refrigerant through its head potion to a condenser 26 where the compressed refrigerant is liquefied and collected in a receiver 28. From the receiver 28, the liquefied refrigerant is forwarded through a supply conduit 30 to an evaporating means 32 shown as of the float controlled flooded type. The liquid refrigerant evaporates within the evaporating means 32 under reduced presure and is returned to the crank case of the compressor through the return conduit 34. The operation of the electric motor is controlled by a snap acting switch means 36 according to the temperature and pressure of the evaporating means 32.

The wall of the crank case of the compressor is provided with a bearing 40 which receives one end of the drive shaft 22 and which is provided with a lubricant receptacle 42 for collecting a portion of the lubricant splashed about within the crank case of the compressor. This receptacle 42 is provided with an oil passage 44 extending to the bearing surfaces of the bearing 40 and a second passage 46 leading to the cavity within the hollow boss 48 provided on the wall of the crank case surrounding the outer end of the drive shaft 22. Within the hollow boss, there is provided a shaft seal generally designated by the reference character 50 which surrounds the reduced end portion 52 of the drive shaft which is separated from the bearing portion of the drive shaft by a shoulder 54.

Figure 2:
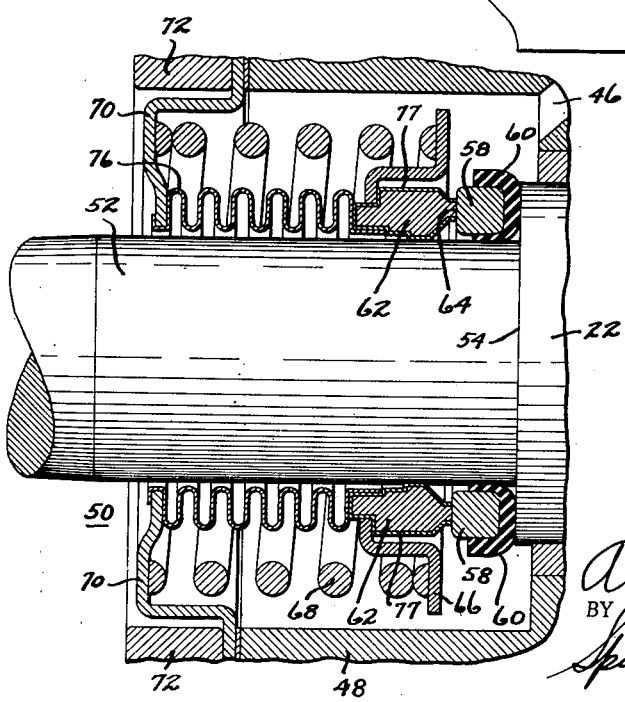
Fig. 2 is an enlarged sectional view of the shaft seal shown in Fig. 1.

Referring now more particularly to Fig. 2, there is shown a nitralloy ring 58 which surrounds the reduced portion of the shaft 52. This nitralloy ring is nitrited and hardened and has its opposite faces ground to provide a hard smooth flat surface. This nitralloy ring is sealed to the shaft by a gasket type sealing ring 60 which extends over one face and a portion of the inner and outer peripheries of the nitralloy ring.

This rubberlike elastic gasket ring fits tightly between the inner periphery of the nitralloy ring and the reduced portion of the shaft 52. Another portion is held tightly between one face of the nitralloy ring and the shoulder 54 upon the drive shaft. I have found that a certain compound of a substance generically called chloroprene is best suited for rubberlike elastic seals for refrigerating systems. This compound is made of the following materials:

| | Parts by weight | Per cent by weight |
|---|---|---|
| Chloro-2-butadiene-1, 3 | 100 parts | 38.2 |
| Litharge | 50 parts | 19.1 |
| Zinc oxide | 2 parts | .8 |
| Abietic acid | 2½ parts | .9 |
| Lamp black (amorphous carbon) | 100 parts | 38.2 |
| Refrigerator oil (mineral oil) | 5 parts | 1.9 |
| Sulphur | 1% | 1 |

These materials are mixed, milled on a hot mill, calendered to thickness, laid in molds and cured by pressure, heat and time.

I find that this elastic rubberlike material withstands the action of refrigerants, particularly moist sulphur dioxide, with the least amount of swelling and deterioration of any material of this type I am acquainted with. It is useful whenever it is desired to use a rubberlike or resilient sealing material between two other materials where resistance to deterioration of certain chemicals and lubricants and a minimum of swelling is desirable.

Contacting with the opposite face of the nitralloy ring 58 is an annular sealing ring 62 provided with a seal face 64 in contact with the nitralloy ring. This seal ring 62 is provided with a flange 66 of tinned or galvanized steel which supports one end of a coil spring 68 extending between the flange 66 and an end plate 70 which is sealed to the outer face of the boss 48 by a clamp ring 72 fastened to the boss 48 by screws 74. The end plate 70 is connected and sealed to the sealing ring 62 by a flexible metal bellows 76.

The portion of the shaft seal surrounding the bellows and the sealing ring is supplied with lubricant and incidentally refrigerant by the passage 46 from the reservoir or pocket 42 and by the lubricant and refrigerant which enters through the bearing surface of the drive shaft 22. Thus the outer peripheries of both the nitralloy ring and the sealing ring 62 as well as the outer periphery of the sealing surface are exposed to the refrigerant and lubricant. It will thus be seen that the outer edge of the sealing surface will receive lubrication but that the inner portions thereof will receive very poor lubrication, if any, because the sealing faces are held tightly together by the coil spring 68 which prevents, under conditions of satisfactory operation, the passage of the lubricant and refrigerant in between the sealing surfaces.

I have found that leaded bronze gives particularly good service under such severe conditions and preferably the seal ring 62 is made of a leaded bronze containing 69% to 71% copper, 20% to 22% lead, and 8½% to 9½% tin. When the refrigerant, such as sulphur dioxide, is perfectly dry, little corrosion of the leaded bronze and the nitralloy ring occurs. However, should moisture enter the system in any way whatsoever, the moist sulphur dioxide will readily attack the leaded bronze and cause a particularly hard, objectionable form of corrosion to form at the outer edge of the sealing surface which tends to cause the two rings, that is the ring 62 and the nitralloy ring 58, to stick together so as to prevent the nitralloy ring 58 from turning with the drive shaft 22. This causes the relative rotation to take place between the nitralloy ring 58 and the drive shaft 22 which causes the dislodging, disrupting or tearing of the rubberlike sealing gasket 60.

I have found that tin and tin alloys do not corrode under such conditions as readily as the leaded bronze, but when used as a material for the sealing ring, do not withstand wear sufficiently well under the severe conditions and particularly under the lack of proper lubrication of the interior portions of the sealing face. In order to overcome these difficulties and to retain the advantages of the leaded bronze, I have devised a means to protect the sealing surface of the leaded bronze from corrosion by providing a sealing surface of a tin or tin alloy flanking and surrounding the sealing surface of the leaded bronze in order to thereby separate the leaded bronze surface from the corrosive action of the wet refrigerant.

In Fig. 2, I have shown one means of doing this by electroplating the leaded bronze ring with the tin or tin alloy to provide an outer coating of tin or tin alloy designated by the reference character 77 which surrounds the leaded bronze ring except for the portion of the sealing face. This portion is removed by the facing of the leaded bronze ring or it may be removed by burnishing or running in the seal. The edge of the tin or tin alloy which protects the sealing face is provided with good lubrication since it is in direct contact with the lubricant within the cavity in the boss 48. Thus, the tin or tin alloy is protected from wear by the presence of the lubricant. The leaded bronze is separated from the lubricant because its need for lubrication is not so great as the tin or tin alloy and it must be separated from the refrigerant to protect it from corrosion.

Either 100% tin or a high tin alloy such as 95% tin and 5% antimony or a 92–8, 90–10 alloy of these materials may be used. However, other materials capable of withstanding corrosion and able to protect the leaded bronze from corrosion, while at the same time withstanding the wear under the lubricating conditions present, may be used in their place, the most promising metals, other than tin, being lead and zinc and their alloys. In this way, I have provided a shaft seal which will withstand the severe conditions imposed upon it in refrigerant compressor.

Figure 3:
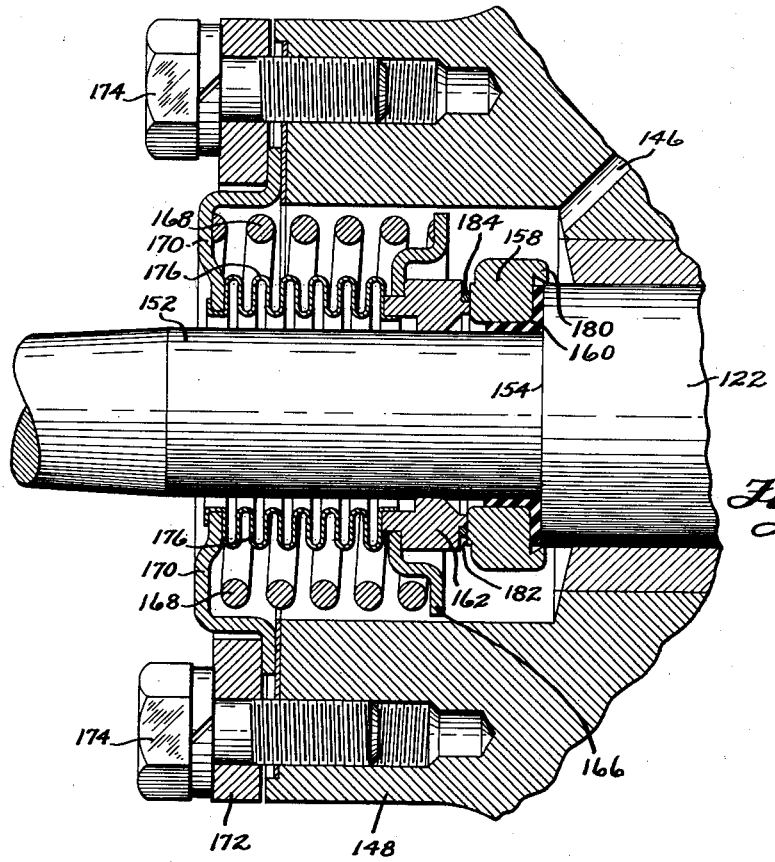
Fig. 3 is an enlarged sectional view of another form of a shaft seal for the compressor shown in Fig. 1.
Figures 4, 5:
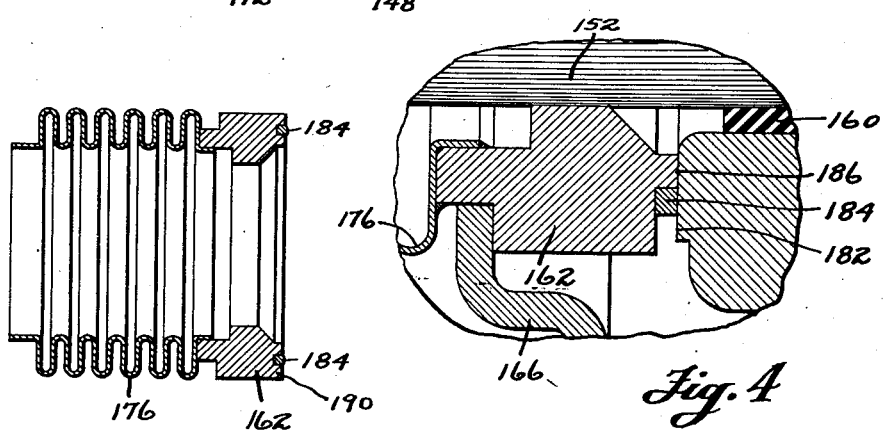
Fig. 4 is a fragmentary, enlarged sectional view of a portion of the seal face of Fig. 3.
Fig. 5 is a sectional view of a portion of the shaft seal shown in Fig. 3 in an intermediate stage of manufacture.

In Figs. 3, 4 and 5, I have illustrated another form of my invention in which there is provided a drive shaft 122, provided with a shoulder 154 which separates the bearing portion of the drive shaft 122 from the reduced portion 152 which is used for driving the compressor. The compressor wall is provided with a hollow boss 148 which is supplied with lubricant and incidentally refrigerant through the oil passage 146. Supported against the shoulder 154 of the shaft 122 is a nitralloy ring 158 which is nitrided and hardened as is the nitralloy ring 58 of Figs. 1 and 2. However, this nitralloy ring 158 is made of such a shape that it better protects the rubberlike gasket ring 160 from the action of refrigerant and lubricant and also causes it to resist displacement, dislodgement or disruption of the ring 160 due to swelling.

In order to do this, the nitralloy ring is provided with a cut back flange portion 180 which has an inner diameter a few thousands larger than the bearing portion of the drive shaft 122. Within the flanged portion 180, the face of the nitrited ring 158 is recessed sufficiently to receive the radial portion of the rubberlike gasket ring. Thus this radial portion of the gasket ring is confined by the flange 180, the shoulder 154 of the shaft 122 and the recessed face portion of the nitralloy ring 158. The rubberlike gasket ring 160 is also provided with a portion which extends along the reduced portion 152 of the drive shaft in a direction away from the shoulder 154 so that it is held tightly between the inner periphery of the nitralloy ring 158 and the reduced portion 152 of the drive shaft 122.

Upon the opposite face of the nitralloy ring 158, there is provided a flat, hard, smooth sealing face 182. A seal ring 162 is held pressed against this sealing face 182 by a compression type coil spring 168 which extends between the end plate 170 and a flange 166 sealed to and surrounding the sealing ring 162. A flexible metal bellows 176 forms a flexible sealed connection between the end plate 170 and the sealing ring 162. The end plate 170 is clamped in tight sealing engagement with the face of the boss 148 by a clamping ring 172 and screws 174.

The shaft seal serves to separate the refrigerant and lubricant within the compressor and the hollow boss 148 from the air without the compressor. Inasmuch as the compressor is driven by an external electric motor, it is necessary to provide relatively rotating sealing surfaces one of which turns with the driving shaft and the other of which remains stationary. In this modification, the rotating sealing surface is the face of the nitralloy ring 158 while the relatively stationary, though axially movable sealing surface or sealing face, is provided by the sealing ring 162. Thus, there is relative rotation between the sealing face 182 of the nitralloy ring 158 and the sealing face of the sealing ring 162. In the same manner as the remaining portions of the shaft seal, these relatively rotating sealing faces are exposed on one side to refrigerant and lubricant and on the other side to atmospheric air. These sealing faces are kept pressed tightly together by the coil spring 168 so that refrigerant and lubricant as well as air are prevented from passing from one side to the other. This also prevents the proper lubrication of the entire face of the sealing ring. However, the edge of the sealing face which is exposed to the refrigerant and lubricant does obtain more lubrication. It, however, is also exposed to the refrigerant.

Heretofore, sealing rings have their faces made ordinarily of not more than one metal. I have failed to find a single metal which will satisfactorily provide the best results and the longest life under such conditions especially when the refrigerant such as sulphur dioxide is used, which seems to form very objectionable corrosion products upon the exposed edge of the bronze sealing faces. I find that bronze sealing faces, while particularly good for withstanding wear under the conditions of poor lubrication such as are present here, do not withstand the corrosion sufficiently well. I also find that other metals which are more satisfactory from a corrosion standpoint, are unable to withstand wear to a sufficiently satisfactory degree under the poor lubricating conditions found in the portion of the sealing face which is remote from lubrication.

As my invention, I have evolved a compound sealing face formed of two different metals. The outer portion of this compound sealing face is formed of tin or tin alloy which requires a good lubrication to withstand wear but which does not corrode rapidly or form very objectionable corrosion products. Inasmuch as this tin or tin alloy is placed upon the edge of the sealing face which is exposed to the lubricant, it does receive sufficiently good lubrication. This sealing face of tin or tin alloy is formed upon the face of a ring 184 of tin or tin alloy which is provided upon the face of the seal ring 162. Instead of tin and tin alloys, other low melting, corrosion resisting alloys such as lead, zinc and their alloys may be used.

Within the sealing face 184 of tin or tin alloy, is the sealing face 186 provided by the projection of a portion of the main body of the sealing ring 162. This main body of the sealing ring 162 is preferably of a good wearing bronze such as a leaded bronze of a suitable composition for resisting wear, such as one containing 69% to 71% copper, 20% to 22% lead and 8½% to 9½% tin. This sealing face 186 is exposed to air upon the one side and protected from corrosion on the other side by the sealing face of tin alloy which separates the leaded bronze sealing face 186 from the refrigerant and lubricant. While the sealing face 186 receives very little lubrication, if any, it wears so well even under such conditions, that the condition is not objectionable. The corrosion of other portions of the seal other than the sealing face, is not sufficiently great as to be materially objectionable.

I have evolved a peculiar method for providing the sealing face of tin or tin alloy. Preferably this is performed at the same time the bellows 176 is soldered to the sealing ring 162. Before the edge of the sealing plate which is to provide the sealing surface is machined to size, it is provided with a groove for receiving the tin alloy. The tin alloy is preferably in the form of a square wire ring which is seated within the groove cut in the face of the sealing ring for the purpose of receiving the tin alloy. At the time the sealing ring 162 is soldered to the bellows 176, this ring of tin or tin alloy is heated sufficiently to cause it to flow and to fill the groove provided for it. Thereafter, after this tin or tin alloy has cooled and adhered to the main body of the seal ring 162, the portion 190 of the seal ring 162 which immediately surrounds the ring 184 of tin or tin alloy, is cut away and then the face of the tin alloy 184 and the projecting portion of the main body of metal of the ring 162 are machined to form the compound sealing face which is disclosed in Figs. 3 and 4.

This tin or tin alloy ring may be of 100% tin or an alloy of tin and antimony in the proportions of 95 to 5, 92 to 8, or 90 to 10. Instead of these particular specific materials, any other metals having the properties of withstanding corrosion under these conditions without forming objectionable corrosion products and capable of withstanding wear under these specific lubricating conditions, may be used. It is highly desirable that the metals used for this ring have a relatively low melting point so that the solder used in the seal construction and the leaded bronzed ring will not be affected by the sweating of this ring into place. It is desirable that the melting point of this ring be several hundred degrees less than the melting point of the solder.

Thus, by providing a compound sealing face, I have enabled each metal to be used in a specific service for which it is better fitted than other metals and I have avoided subjecting each metal to a condition for which it is not well suited.

While the form of embodiment of the invention as herein disclosed, constitutes a preferred form, it is to be understood that other forms might be adopted, all coming within the scope of the claims which follow.

What is claimed is as follows:

1. A shaft seal including a wall member having a shaft opening therein, a shaft member passing through said shaft opening, one of said members being provided with an axially stationary sealing surface, the other of said members being provided with an axially movable sealing surface in contact with the axially stationary sealing surface, one of said sealing surfaces being provided with an annular sealing surface formed of metal having a high resistance to wear under poor lubricating conditions, said metal annular sealing surface being flanked by a sealing surface of another metal for protecting the first mentioned metal sealing surface, said last mentioned sealing surface being exposed to lubricant and corrosion and having a higher resistance to corrosion than said first mentioned metal sealing surface.

2. A shaft seal including a wall member having a shaft opening therein, a shaft member passing through said shaft opening, one of said members being provided with an axially stationary sealing surface, the other of said members being provided with an axially movable sealing surface in contact with the axially stationary sealing surface, said sealing surfaces being exposed to corrosive substance and lubricant on one side thereof, one of said sealing surfaces being formed of two metals, the edge of said one of the sealing surfaces exposed to the corrosive substance and lubricant being formed of metal requiring lubrication but being resistant to corrosion, another portion of said sealing surface remote from the lubricant and corrosion being formed of metal requiring little lubrication but having a low resistance to corrosion.

ALEX A. McCORMACK.